United States Patent Office 3,623,375
Patented Nov. 30, 1971

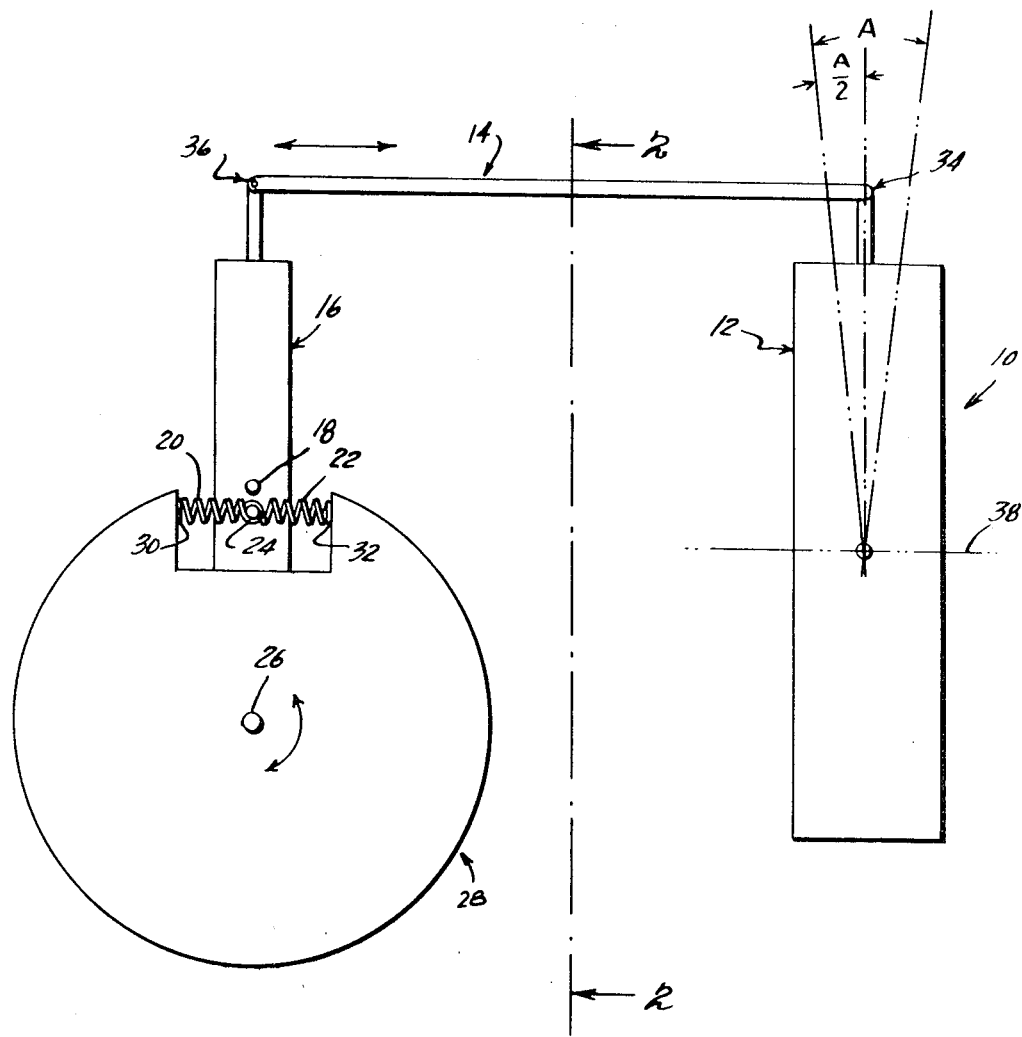

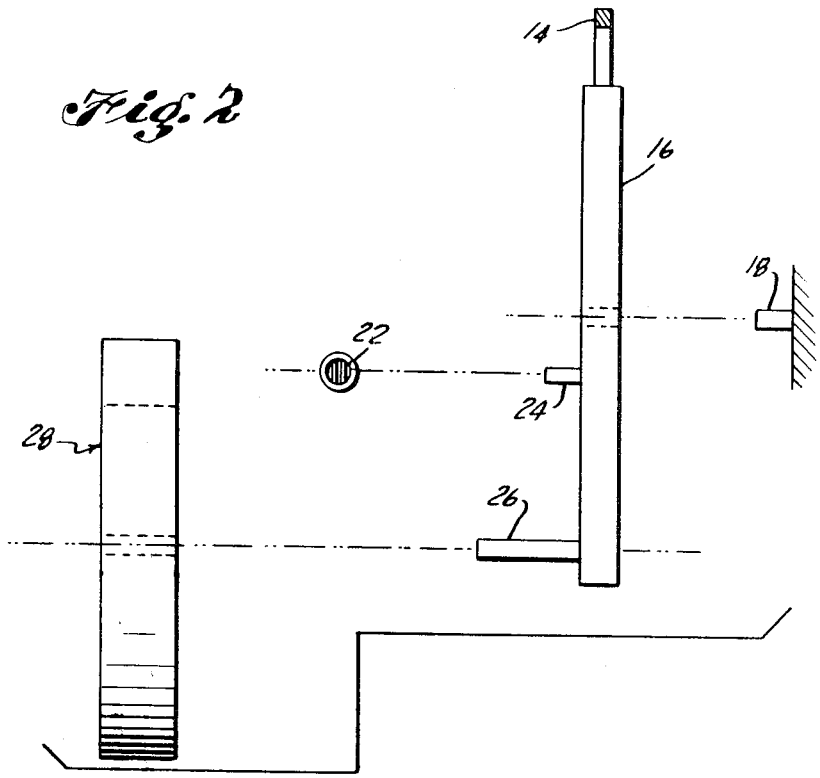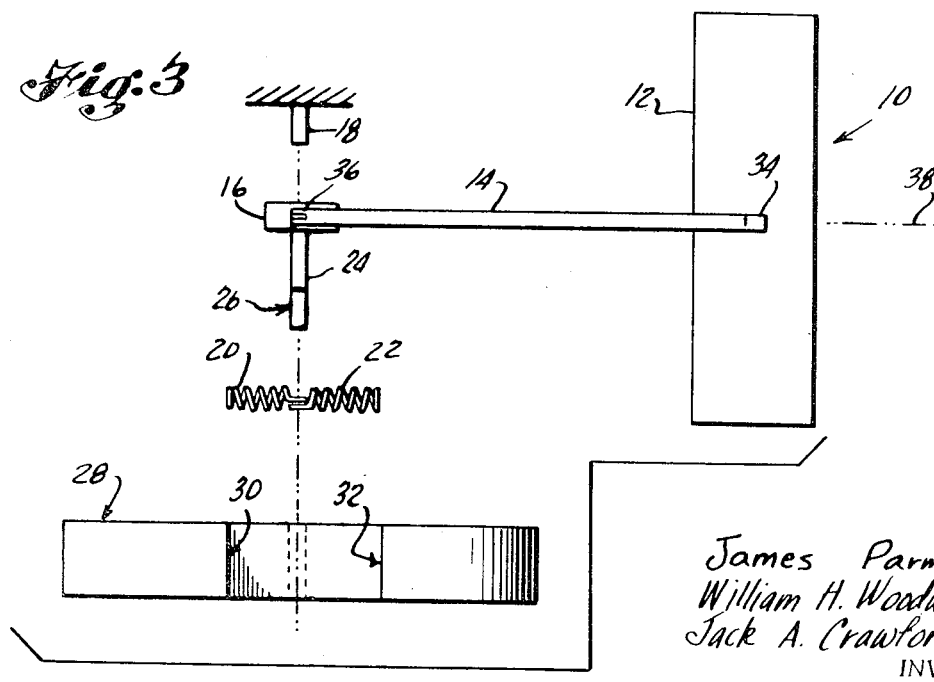

3,623,375
GYRO-NUTATION DAMPER
William H. Woodworth and Jack A. Crawford, China Lake, Calif., and James Parmerlee, Indianapolis, Ind., assignors to the United States of America as represented by the Secretary of the Navy
Filed Feb. 26, 1970, Ser. No. 14,406
Int. Cl. G01c 19/04
U.S. Cl. 74—5.5                                    6 Claims

ABSTRACT OF THE DISCLOSURE

A gyro-nutation damper having a mass and spring combination with a resonant frequency equal to the nutation frequency. The nutation causes the mass to rotate. The rotation is started in first one direction and then the other by springs connected to the mass and the coupling shaft.

GOVERNMENT INTEREST

The invention described herein may be manufactured and used by or for the Government of the United States of America for governmental purposes without the payment of any royalties thereon or therefor.

BACKGROUND OF THE INVENTION

The invention relates to a guidance system of a missile and more particularly to the gyro of that system.

In operation a gyro tends to cyclically vary the inclination of its axis, or nutrate. Various attempts have been made to damp the gyro's nutation, among which is that disclosed in U.S. Pat. No. 2,837,923 which relates to a resonant nutation damper having tuneable rubber arms.

BRIEF DESCRIPTION OF THE DRAWINGS

FIG. 1 is a diagrammatic front elevation of the nutation damper;

FIG. 2 is an expanded diagrammatic side elevation of the invention taken along line 2—2 of FIG. 1; and FIG. 3 is an expanded diagrammatic top view of the invention.

DESCRIPTION OF THE PREFERRED EMBODIMENT

The present invention utilizes resonant frequency matching principles, and provides a simpler and more readily manufacturable device than the prior art. The damper is tuned to resonate at the gyro's nutation frequency because the largest angular motion of the mass 28 is obtained at that frequency, resulting in the most effective damping.

Referring now to the drawings for a more detailed description of the invention, FIGS. 1, 2 and 3 illustrate a gyro-nutation damper comprising a gyro 10, and push-rod 14, a shaft 16, springs 20 and 22, and a circular mass 28.

The gyro 10 is any gyroscopic device suitable for use in a missile.

The gyroscopic rotor housing 12 is connected to shaft 16 via push-rod 14. Push-rod 14 has at least two joints 34 and 36 which prevent binding and allow the push-rod 14 to move freely when nutation occurs. Joint 34 can be of the type that provides two degrees of freedom so that binding will not occur when the gyro 10, having spin axis 38, moves the housing 12 in the direction indicated by A in FIG. 1, or about an axis parallel to the plane of FIG. 1. Joint 36 has at least a single degree of freedom and, along with joint 34, allows the push-rod to move back and forth as indicated in FIG. 1.

When nutation occurs, as indicated by A/2, the housing 12 forces push-rod 14 to the left. Shaft 16, attached to push-rod 14, is pivoted about pivot-point 18 causing bearing 26 to describe a counterclockwise arc.

Circular mass 28, rotatably attached to bearing 26 and in combination with springs 20 and 22 having a natural angular frequency equal to the nutation frequency of the gyro, is forced into counter-clockwise angular rotation by springs 20 and 22 as follows: spring 20, attached by one end to mass 28 at point 30 and by the other end to shaft 16 at arm 24, and spring 22, attached by one end to mass 28 at point 32 and by the other end to shaft 16 at arm 24, exert a counterclockwise force on mass 28 tending to maintain the relative angular position of mass 28 to shaft 16, thereby rotating mass 28 counter-clockwise about the bearing's spatial point.

Similarly, when push-rod 14 is forced to the right, shaft 16 causes the bearing's spatial point to describe a clockwise arc, and springs 20 and 22 force mass 28 into clockwise angular rotation about bearing 26.

Therefore, since the gyro's nutation is cyclic, mass 28 only begins to rotate counter-clockwise before a clock-wire force is applied to it, and vice-versa, causing mass 28 to alternately compress and tense springs 20 and 22.

Damping is accomplished by the dissipation of the nutation energy in pivot 18, bearing 26, springs 20 and 22, and joints 34 and 36.

Numerous other embodiments and alternatives are encompassed by the invention, such as providing a single connector between the gyro rotor housing 12 and the mass 28; providing the mass 28 with any suitable shape, such as rectangular, triangular, or semi-circular, while retaining resonant frequency matching characteristics; adapting the damper to be frequency tuneable; and placing the mass 28 at other positions along the shaft 16.

In résumé the operation is as follows, the gyro's nutation imparts angular motion to shaft 16. Springs 20 and 22 cause mass 28 to begin to rotate about the bearing's spatial point. As the angular motion of shaft 16 is reversed as a result of the cyclic nature of gyro nutation, the force exerted on mass 28 by springs 20 and 22 is also reversed causing mass 28 to stop rotating in the initial direction and begin counter rotation. The nutation energy is dissipated in the springs 20 and 22 and friction couplers 18, 26, 34 and 36, resulting in gyro nutation damping.

What is claimed is:
1. A gyro nutation damper comprising:
a gyro having nutation;
a mass and spring combination having a natural angular frequency equal to the frequency of said gyro nutation; and
means connecting said combination to said gyro so that said nutation is damped, including a coupler rotatably pivoted about a fixed point and attached to said gyro, comprising a push-rod and a shaft wherein
said push-rod is connected to said gyro and said shaft,
said shaft is connected to said push-rod and said mass, and
said shaft is pivoted about said fixed point.

2. The damper of claim 1
wherein said means further comprises a bearing attached to said shaft rotatably supporting said combination; and
wherein said spring is attached to said mass and said coupler tending to maintain the relative angular position of said mass to said shaft such that said nutation causes said shaft to pivot about said fixed point imparting rotational motion to said mass.

3. The damper of claim 1 wherein said bearing is attached to said shaft between said gyro and said fixed point.

4. The damper of claim 1 wherein said bearing is attached to said shaft at said fixed point.

5. The damper of claim 7 wherein said bearing is attached to said shaft beyond said fixed point from said gyro.

6. The damper of claim 1 wherein said mass is circular, having a cut-out portion within which said spring is attached to said mass and said coupler.

References Cited
UNITED STATES PATENTS

| | | | |
|---|---|---|---|
| 2,520,929 | 9/1950 | Hammond, Jr. | 74—5.5 |
| 2,534,963 | 12/1950 | Fowler | 74—5.5 |

MANUEL A. ANTONAKAS, Primary Examiner

U.S. Cl. X.R.

73—430